United States Patent [19]

Braun

[11] Patent Number: 5,506,003
[45] Date of Patent: Apr. 9, 1996

[54] METHOD FOR TINT REHABILITATION OF ROCKS

[75] Inventor: Moshe Braun, Jerusalem, Israel

[73] Assignee: GEOPROSPECT 1986 JERUSALEM LTD., Jerusalem, Israel

[21] Appl. No.: 305,680

[22] Filed: Sep. 14, 1994

[30] Foreign Application Priority Data

Sep. 14, 1993 [IL] Israel ......................................... 107009

[51] Int. Cl.$^6$ ........................................................ B05D 1/02
[52] U.S. Cl. ........................... 427/421; 427/136; 427/140; 427/399; 427/427
[58] Field of Search ....................................... 427/136, 140, 427/399, 427, 421; 106/456

[56] References Cited

U.S. PATENT DOCUMENTS 4,299,863  4/1981  Tanimoto et al. .................... 427/140
4,725,451  2/1988  Cripe ................................... 427/140

*Primary Examiner*—Shrive Beck
*Assistant Examiner*—David M. Maiorana
*Attorney, Agent, or Firm*—Lowe, Price, LeBlanc & Becker

[57] ABSTRACT

A method is disclosed for rehabilitating an exposed cut surface of a rock formation after rock cutting has occurred so that the fresh cut surface becomes weathered and natural within several weeks to facilitate restoration back to its original shade as a part of the natural scenery. Weathering occurs by applying a solution containing $FeCl_2$ or $MnSO_4$ to the surface of the rocks to be colored. These rocks are limestone, dolostone, phosphorite and concrete. A method for preparing a weathering solution is also disclosed.

8 Claims, No Drawings

METHOD FOR TINT REHABILITATION OF ROCKS

FIELD OF INVENTION

The present invention relates to a method for changing the color of the quarried surfaces of boulders, rocks, stones, artificial stones and concrete. More specifically the present invention deals with a method for changing the color of the quarried surfaces of boulders, stones, artificial stones and concrete (hereinafter called "rocks") after being broken, wherein by means of a chemical reaction the color is changed from a light shade to a darker gray or brown, giving the surface of the stone a natural weathered color, as if it was long exposed to changing weather. The present invention also relates to the chemical solutions to be used in the abovementioned method, and to a method for their preparation.

BACKGROUND OF THE INVENTION

The awareness of protecting the environment and restoring the natural scenery has grown in the past years all over the world, due to the necessity to break through mountains for streets and highways, and to quarry boulders and stones for building and industry.

One of the harder problems in protecting natural scenery is the bright color of the surface of stones and the various shades they receive after mining, compared to brown gray or brown yellow, the natural color of stones exposed to the atmosphere for long periods of time. This color difference between various shades of gray and a light yellow or white, is an obstacle to the natural scenery and the beauty of nature. Stone exposed to the atmosphere—for example in the process of widening a highway passing along a mountain—would naturally change the color of its surface back to its original shade only after many years. The purpose of this invention is to provide a method by which the color of the surface of the said stone could become weathered and natural within three weeks, thus minimizing the time that the scenery is imperfect.

SUMMARY OF THE INVENTION

The present invention relates to a method for tint rehabilitation of rocks after rock cutting comprising the applying of a solution containing $FeCl_2$ or $MnSO_4$ to the surface of said rocks. The rocks to be colored are limestone, dolostone or phosphorite and concrete. Said invention further relates to a method for the preparation of the abovementioned solution wherein the $FeCl_2$ is diluted in water between 1:5 to 1:500 weight ratio $FeCl_2:H_2O$ and the $MnSO_4$ is diluted in water between 1:5 to 1:500 weight ratio $MnSO_4:H_2O$. This invention also relates to solutions of $FeCl_2$ or $MnSO_4$ dissolved in water for tint rehabilitation of rocks.

DETAILED DESCRIPTION OF THE INVENTION

The present invention relates to a method for tint rehabilitation of quarried surfaces boulders, rocks, stones, and artificial stones (hereinafter called "rocks") such as limestone, dolostone (dolomite) and phosphorite and concrete. Said method comprises the applying of a solution containing $FeCl_2$ or $MnSO_4$ to the surface of said rocks. The preferred solutions according to the present invention are aqueous solutions of $FeCl_2$ or $MnSO_4$. The reaction between the rocks surface and the $FeCl_2$ solution create a brownish-yellow color on the rock surface within approximately three weeks, whereas the reaction between the rocks surface and the $MnSO_4$ solution create a grayish-brown color on the rock surface within approximately three weeks.

The chemical reactions that takes place between the rocks surface and the $FeCl_2$ solution are as follows:
a) Limestone: $FeCl_2 + CaCO_3 \rightarrow FeCO_3$
b) Dolostone (Dolomite): $FeCl_2 + (Ca, Mg)CO_3 \rightarrow FeCO_3$
c) Phosphorite: $FeCl_2 + Ca_2(PO_4, CO_3)_3 (F, OH, Cl) \rightarrow Fe_3(PO_4, CO_3)_3 (F, OH, Cl)$.

The $FeCl_2$ is dissolved in water in a dilution of 1:5 to 1:500 (weight ratio $FeCl_2:H_2O$). HCl may be added to the solution for a better reaction. The preffered pH is 4.0 to 6.0. 100 $M^2$ of rocks near Be'er Orah (near the city of Zilat-Israel) were successfully treated by spraying said rocks with the $FeCl_2$ solution with a dilution ratio of 1:100, by means of an agricultural sprayer.

The chemical reactions that takes place between the rocks surface and the $MnSO_4$ solution are as follows:
a) Limestone: $MnSO_4 + CaCO_3 \rightarrow MnCO_3$
b) Dolostone (Dolomite): $MNSO_4 + (Ca, Mg)CO_3 \rightarrow MnCO_3$
c) Phosphorite: $MnSO_4 + Ca_2(PO_4, CO_3)_3 (F, OH, Cl) \rightarrow Mn_3(PO_4, CO_3)_3 (F, OH, Cl)$.

The $MnSO_4$ is dissolved in water in a dilution of 1:5 to 1:500 (weight ratio $MnSO_2: H_2O$). The preferred pH is 4.0 to 6.0. $H_2SO_4$ may be added to the solution for a better reaction. 13,000 $M^2$ of rooks near the city of Eilat (Israel) were successfully treated by spraying said rocks with the $MnSO_4$ solution with a dilution ratio of 1:300, by means of an agricultural sprayer. 8000 $M^2$ of rocks near the city of Karmiel (Israel) were successfully treated with the $MnSO_4$ solution with a dilution ratio of 1:70, by means of an agricultural sprayer. The rate of the solution flux from the agricultural sprayer is between 50 to 1000 liters per hour.

The examples previously described are presented to clarify and exemplify the preferred embodiment of the invention, and do not intend to limit the scope of the defense. For instance, the solutions used in this method may be applied to the rock surface by means of a brush, and not only by means of a sprayer.

I claim:

1. A method for tint rehabilitation of the quarried surface of rock after rock cutting comprising applying a solution containing $MnSO_4$ to the surface of said rock.

2. A method according to claim 1 wherein the rocks are selected from the group consisting of limestone, dolostone, phosphorite and concrete.

3. A method according to claim 1 wherein the solution is an aqueous solution of $MnSO_4$.

4. A method according to claim 1 wherein the $MnSO_4$ is diluted in water between 1:5 to 1:500 weight ratio $MnSO_4: H_2O$.

5. A method according to claim 4 wherein $H_2SO_4$ is added to the solution.

6. A method according to claim 3 wherein the pH of the solution is 4.0–6.0.

7. A method according to claim 1 wherein the solution is applied to the rock surface by spraying.

8. A method according to claim 7 wherein the rate of solution flux from the sprayer is 50–1000 liter per hour.

* * * * *